United States Patent [19]

Bacardit

[11] Patent Number: 4,459,897
[45] Date of Patent: Jul. 17, 1984

[54] POWER STEERING DEVICE

[75] Inventor: Juan S. Bacardit, Barcelona, Spain

[73] Assignee: Bendiberica, Barcelona, Spain

[21] Appl. No.: 314,807

[22] Filed: Oct. 26, 1981

Related U.S. Application Data

[63] Continuation of Ser. No. 125,720, Feb. 28, 1980, abandoned, which is a continuation of Ser. No. 854,560, Nov. 25, 1977, abandoned.

[30] Foreign Application Priority Data

| | | | |
|---|---|---|---|
| Nov. 29, 1976 | [ES] | Spain | 453991 |
| Nov. 29, 1976 | [ES] | Spain | 453992 |
| Feb. 15, 1977 | [ES] | Spain | 455906 |
| Apr. 14, 1977 | [ES] | Spain | 457777 |

[51] Int. Cl.$^3$ .............................................. F15B 9/10
[52] U.S. Cl. .................... 91/375 A; 91/372; 137/625.21
[58] Field of Search ................ 91/375 A, 375 R, 373, 91/372, 371, 370

[56] References Cited

U.S. PATENT DOCUMENTS

| | | | |
|---|---|---|---|
| 2,988,059 | 6/1961 | Wysong, Jr. | 91/375 A |
| 3,393,608 | 7/1968 | Saunders | 91/375 A |
| 3,408,900 | 11/1968 | Tomita | 91/375 A |
| 3,735,832 | 5/1973 | Akima | 137/625.24 |

Primary Examiner—Paul E. Maslousky
Attorney, Agent, or Firm—Larry J. Palguta; Paul David Schoenle; Ken C. Decker

[57] ABSTRACT

A power steering control valve comprises a pair of rotatable elements respectively attached to input and to output members for controlling fluid flow toward first and second actuator chambers. A disc-shaped chamber having two end walls and a circumferential wall is defined by structure attached to one of the rotatable members. The other rotatable element is a star-shaped rotor coaxial with and rotatably mounted in the disc-shaped chamber, and includes a hub from which extends a plurality of legs cooperating with the walls of the disc-shaped chamber so as to separate the latter into a plurality of pressure chambers which are circumferentially distributed. Two consecutive pressure chambers communicate respectively with the first and second actuator chambers via first and second work passages. Two consecutive legs respectively face an inlet passage opening and an outlet passage opening. In a rest position of the control valve, each leg substantially closes fluid communication from a corresponding opening to the disc-shaped chamber. The star-shaped rotor moves in response to actuator of the input member so that each leg moves past its corresponding opening to allow substantially uninhibited fluid communication between the inlet passage and one of the actuation chambers and to restrict fluid communication between the outlet passage and the other actuation chamber.

24 Claims, 21 Drawing Figures

FIG_4

FIG_7

FIG.21

POWER STEERING DEVICE

This is a continuation of application Ser. No. 125,720, filed Feb. 28, 1980, now abandoned, which is a continuation of Ser. No. 854,560, filed Nov. 25, 1977, now abandoned.

Therefore, the object of the present invention is to propose a novel type of power steering device which permits an important reduction of the axial length of the steering gear.

According to the present invention, it is proposed a power steering device comprising a rotatable input member and a coaxial rotatable output member resiliently connected to the input member, a fluid actuator operably connected to the rotatable output member, a control valve comprising a pair of rotatable elements respectively attached to the input and to the output members for controlling fluid flow toward the first and second chambers of the actuator, said rotatable elements being provided with inlet and outlet passages adapted to be connected to a high pressure source and a low pressure source, and with first and second work passages respectively communicating to the first and second compartments of the fluid actuator, said power steering device being characterized in that a disc-shaped chamber having two end walls and a circumferential wall, said chamber being coaxial with the input and output members, is defined in a unit which is attached to one of the rotatable members, with the inlet, outlet, first and second work passages provided in said unit and each passage opening into said disc-shaped chamber, the other rotatable element being a star-shaped rotor rotatably mounted in the disc-shaped chamber, and comprising a hub from which extends a plurality of legs cooperating with the walls of said disc-shaped chamber so as to separate the latter into a plurality of pressure chambers which are circumferentially distributed, two consecutive pressure chambers communicating respectively with the first and with the second compartment of the fluid actuator by way of the first and the second work passages, the inlet and outlet passages terminating by openings provided in the inner wall of the disc-shaped chamber, the rotor being so mounted with respect to the disc-shaped chamber that, in a normal position defining the rest position of the control valve, each leg faces a corresponding opening to substantially close fluid communication from said opening to the disc-shaped chamber, the legs and openings being so disposed that two consecutive legs respectively face an opening in communication with the inlet passage and an opening in communication with the outlet passage, said star-shaped rotor being movable with respect to the disc-shaped chamber, in response to actuation of the input member so that each leg moves past its corresponding opening to allow substantially uninhibited fluid communication between said opening and one of the pressure chambers adjacent said each leg, and to restrict fluid communication between said opening and the other pressure chamber adjacent to the leg.

Due to this novel structure, it could also be appreciated that there results a considerable simplification in the manufacturing process of the power steering device according to the invention. Moreover, this structure also permits to hydraulically balance the system thereby reducing the thrusts acting on the bearings and on the components of said system.

The invention will now be described by way of example, with reference to the accompanying drawings, wherein.

The reference no. 1 generally indicates the housing of a steering box partially shown in which is defined a bore 2. A piston 3 is allowed to axially and non rotatably move in bore 2, said piston 3 being guided by conventional not illustrated devices and being also tightly sealed by means of seals such as the one which bears reference 4, in such a manner that it separates bore 2 into two actuation or working chambers 5 and 6. This piston is provided on its outside with a toothed rack 7 which gears up with a toothed sector (not shown in the drawing) which is part of the output shaft of the steering gear, and the piston is axially perforated with a drilled bore 8 which is a blind ended hole at the end that is not shown in FIG. 1 of the drawings. Bore 8 comprises an enlarged diameter portion opening into chamber 5. A nut 11 which comprises a conventional ball recirculating circuit 12 is fastened in the enlarged portion of bore 8 by means of a threaded ring 9 and a locking pin 10, the said nut being thus drivingly coupled with a threaded control spindle 13, in a conventional manner.

The opening of the steering box has an inner seating shoulder 14 defined in the bore 2 and on which a ring 15 seats. A seal 16 provides fluid tightness between the bore 2 and the annular ring 15. This ring 15 is held in position by the cylindrical neck 17 of the lid or cover 19 which closes the open end of the steering box, the neck 17 being slidably mounted in bore 2, with a seal 18 that assures fluid-tightness between the bore 2 and the neck 17. This part of the assembly includes the devices for guiding the upper end of the spindle 13 which is to that effect broadened and forms a head with the general reference 20, the said head being guided on the one hand by means of its cylindrical outer portion 21 which is rotatably fitted in a bush bearing 22 which is press fitted inside the ring 15, and on the other hand by means of two needle bearings 23 and 24 inserted between a central flange-like broadened portion of the head 20 and the two opposed surfaces respectively belonging to the ring 15 and to an inner cavity of the cover-head 19. The spaces containing the two described needle bearings are fluidically separated from each other by an O-ring seal 25, and by means of other seals 26 with respect to the spaces externally adjacent to them.

The flange-like portion of the head 20 consists in reality of a unit, or structure, having a first flange 27 incorporating the needle race of the needle bearing 24 and the seal 25, and a second similar flange 28 which is part of an annular plate 29 and incorportes the needle race of the needle bearing 23. The flange-like portion also comprises an annular spacer 30 which is fastened between these two flanges and the whole assembly is fixed by means of three screws 31 thus forming a rigid unit.

The spindle 13 is actuated through the torsion bar 32 which is fastened to the former by means of conventional devices not shown in the drawing and situated near the lower end of the same, the said torsion bar being attached at its upper end to the shaft 33. The shaft 33 can advantageously be made integral with the torsion bar 32, so that it passes through the flange-like portion assembly and protudes to the outside through an opening or aperture in cover 19, ending in serrations 34 which are apt to receive an input member formed by the mechanical transmission coming from the steering wheel. To this end, according to a usual design practice, there is provided a drilled hole 35 axially passing through the spindle Hole 35 houses the torsion bar and comprises a broadened zone in its upper part where it forms a cavity that couples itself with the shaft 33 through a combination 36 of loosely fitting ribs and grooves defining teeth mounted with circumferential clearance in such a manner that, although it allows a limited rotational movement of the said shaft with respect to the head 20 apart from a central resting or neutral position, it also guarantees the positive drive of the spindle or output rotating member by the shaft in the sense of the drive, starting at the moment when the clearance in the said sense has disappeared, which may occur in case of failure of power assistance. The shaft is guided on the other hand by means of a bush bearing 37 which is assembled in the central opening of the cover 19 and the tight sealing is obtained in this place by means of a seal 38, mounted adjacent the bush bearing 37 between the shaft 33 and the cover.

The space enclosed between two opposite faces 39 and 40 of flanges 28 and 27 respectively and the inner surface of the annular spacer 30, forms a disc-shaped annular chamber of the valve device. That is, the surface 40 of flange 27 forms one end wall of the disc-shaped chamber; the surface 39 of annular plate 29 forms the other end wall of the chamber; and the inner surface of annular spacer 30 forms the axially extending circumferential wall of the chamber. The two end walls and the circumferential wall cooperate to define the inner wall of the disc-shaped chamber. A control organ which consists in a star-shaped rotor bearing the general reference 41 is located in the disc shaped chamber. The star-shaped element 41 comprises a central portion featuring an annular hub 42 (FIG. 2) from which radially extend a plurality of legs 43 comprising three legs 43a which are alternately arranged between another three identical legs 43b, in such a manner that they are all equally angularly spaced. The inner surface of hub 42 is provided with two diametrically opposed radially inwardly protuding ribs 44 which fit positively into complementary grooves of a coupling ring 45, which is in its turn provided with another two inner grooves 46 through which it fits in a similar manner with ribs 47 of shaft 33, these being part of the above mentioned ribs and grooves combination 36 for the drive of the spindle by the shaft. In this manner, the star-shaped control organ 41 rotates within the disc shaped cavity formed between flanges 27, 28 and spacer ring 30 in the same way as shaft 33 does with respect to spindle 13, the engagement of the grooves 46 with the ribs 47 permitting axial movement therebetween.

The axially oriented surfaces of the star-shaped control organ 41 fit with the opposite walls 39 and 40 of the disc-shaped chamber, and the ends of all the radial legs 43 fit with the inner surface of the spacer ring 30, in such a manner that between these surfaces three chambers 48a are delimited which are alternately placed between another three chambers 48b, all of them being mutually independant and isolated with respect to the adjacent spaces of the device.

Figure 1:
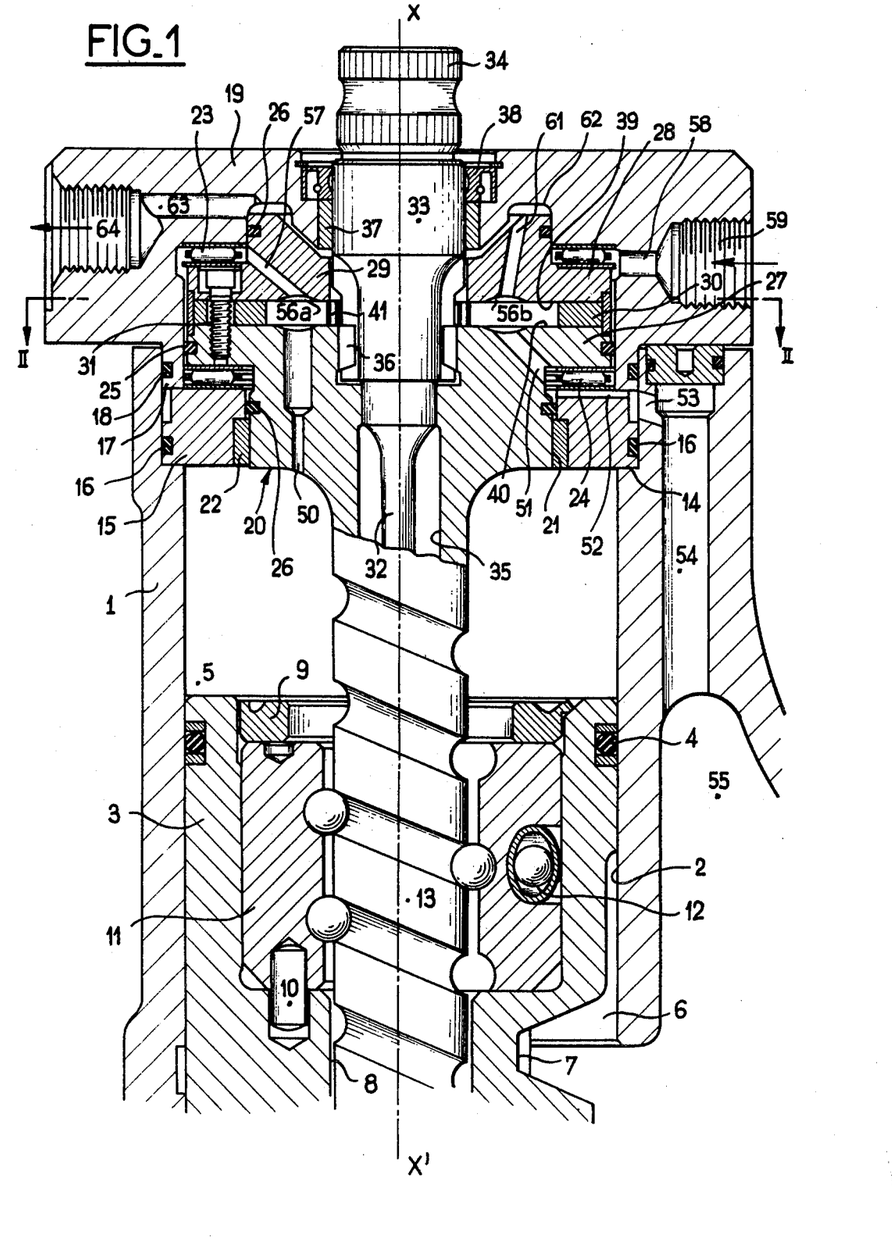
FIG. 1 shows a partial longitudinal view in cross-section of a preferred embodiment of the power steering device according to the invention, FIG. 2 shonws a view in cross-section taken along line II—II of the power steering device shown on FIG. 1, illustrating the position of the components of the valve of the power steering device in the rest position.
Figure 2:
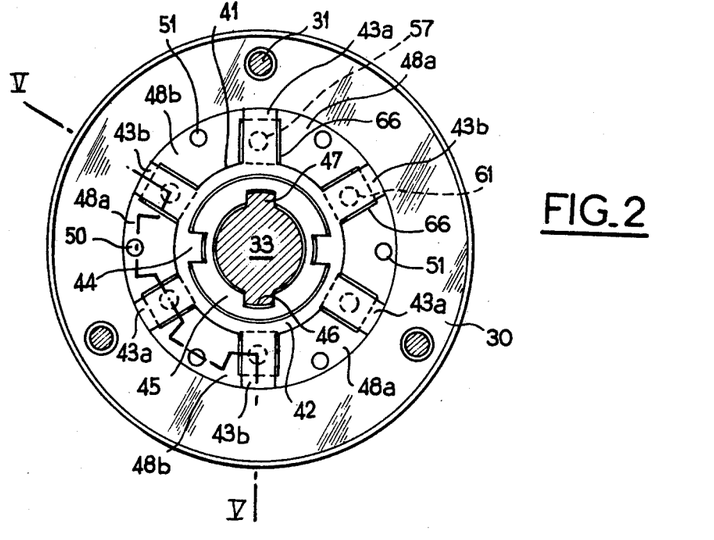

Work passages 50 (one shown on FIG. 1) are defined in head 20, to respectively communicate everyone of the three chambers 48a with chamber 5 of the power steering device. From chambers 48b depart three other work passages 51 (one shown) also formed in head 20, which end up in the chamber of the needle bearing 24, the said chamber being connected, through passages 52, 53 and 54 formed in the ring 15 and in the housing 1, with the steering box inner space 55, which, as can be seen in the lower part of FIG. 1, is part of the other actuation chamber 6 of the actuating cylinder. On the other hand, in the surface 39 of the disc-shaped chamber, openings 56a, 56b have been foreseen in substantially overlapping relation respectively with the legs 43a, 43b of the star-shaped control organ 41, the arrangement being such that the said openings are almost entirely covered by the legs in the steering's neutral or resting position (parallel wheels) as it is indicated in FIGS. 2 and 5, but they can be uncovered at one or the other side depending on the sense of actuation of the steering wheel, as it can be appreciated in FIGS. 3 and 6 on the one hand, and 4 and 7 on the other hand.

Figure 5:
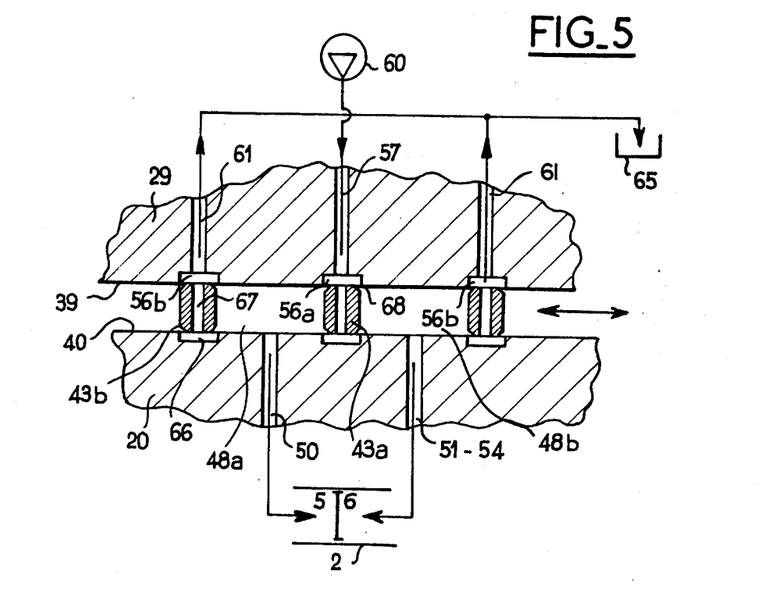
Figure 6:
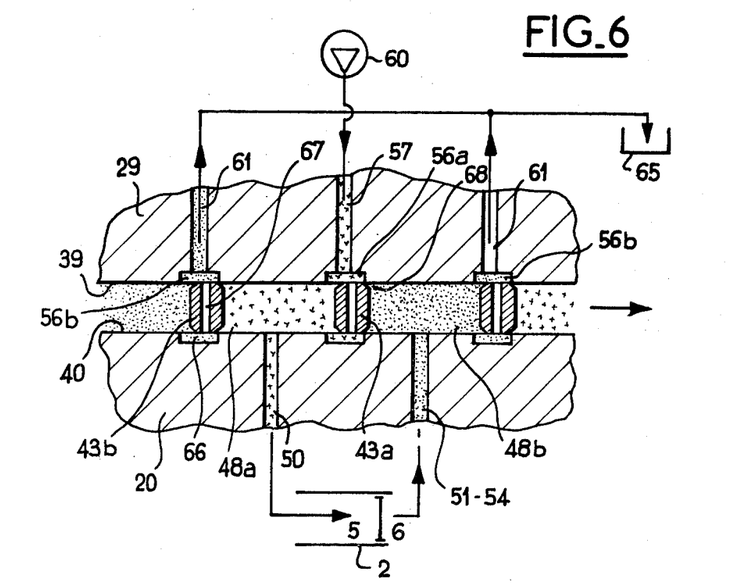
Figure 7:
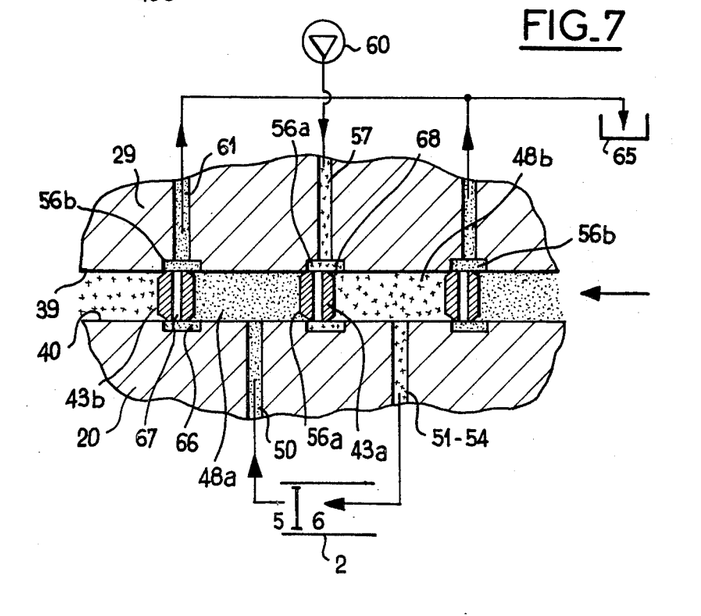

An inlet passage 57 departs from everyone of the openings 56a and ends up in the housing space of the needle bearing 23, the said space being in its turn connected through a channel 58 with an inlet orifice 59 provided in the outer surface of the cover-head 19 and to which a pipe coming from the oil pressure source 60 is connected (see FIGS. 5 to 7). In a similar manner, outlet passages 61 (one shown on FIG. 1) depart from everyone of the openings 56b, and these passages go through plate 29 and end up in the internal cavity 62 of the cover 19. In cover 19, a passage 63 departs from cavity 62 and ends up in an outlet orifice 64 to which is connected a pipe leading to a low pressure source formed by a reservoir 65 (FIGS. 5 to 7).

It is to be noted that in FIG. 1 the representation of the cross-section of the legs 43 has been omitted, and it has been supposed that all the channels described are in the same plane, for the sake of clarity of the description. The real positions of these passages can be easily deduced when considering FIGS. 2 and 5 and the following description.

In FIGS. 5 to 7, it can be appreciated on the other hand that the disc-shaped chamber's surface 40, which is opposite to the surface 39 with the openings 56a, 56b has been provided with cavities that have the same shape as the said openings and which are disposed opposite the respective corresponding openings, said cavities being identified with the reference 66. The cavities cooperate together with the legs 43 of the control organ 41 in the same manner as openings 56a, 56b do. However, no passages as those 57, 61 described in relation with the openings 56a, 56b depart from these cavities. The cavities 66 are connected with the said openings through drilled axial holes 67 that pass through the said legs 43 with the result that the same fluid pressure is always available on the two axial faces of the control organ. Thus, the star-shaped control organ 41 is pressure-balanced in the annular chamber and no undue reactions or frictions can ever take place. It can on the other hand be appreciated that the lateral edges of the legs 43 are provided with chamferings or radiusings 68 which could be alternatively foreseen at the edges of the openings and cavities 56 and 66 respectively and which can be carried out with any adequate shape so as to obtain the desired variation of the passage cross-section formed between both elements as a function of the angle of rotation of the legs with respect to the openings.

To finish the description, it should also be noted that further seal elements (not shown on the drawings) could be disposed in grooves defined in one face of the facing surfaces of the annular spacer 30 and of each extremity of the legs 43 to fully insure fluid tight separation between adjacent chambers 48a and 48b. These seals could be made of a material having a very low friction coefficient such as for instance polytetrafluorethylene (commonly known as Teflon), to avoid the hysteresis phenomenon. Furthermore, the provision of such seals facilities manufacturing of the power steering device since only the faces of the legs (or of the spacer ring) which are in contact with the portions of the seals which protude out of the grooves formed in the spacer ring radial inner surface (or in the faces of the legs) need be machined with great precision. If no seal element is provided, it is necessary that both facing surfaces (those of the spacer ring, and those of the extremities of the legs) be very accurately machined (with a precision of a few microns).

The operation of the described system will now be explained with references to FIGS. 2 to 7 of the drawings.

In the neutral or resting position of the steering system when the vehicle runs straight ahead with parallel wheels and assuming that there is not any abnormal reaction due to a defect in the steering's geometry or to peculiarities of the road, the valve device remains in the position shown in FIGS. 2 and 5. The legs 43a, 43b are facing the corresponding openings 56a, 56b and cavities 66 thus practically but not totally closing them, and the small oil leakages eventually taking place between the edges of the legs and the above mentioned openings and cavities will be counterbalanced and self-compensated at both sides of the said legs, in such a manner that the mechanism remains in this state.

Figure 3:
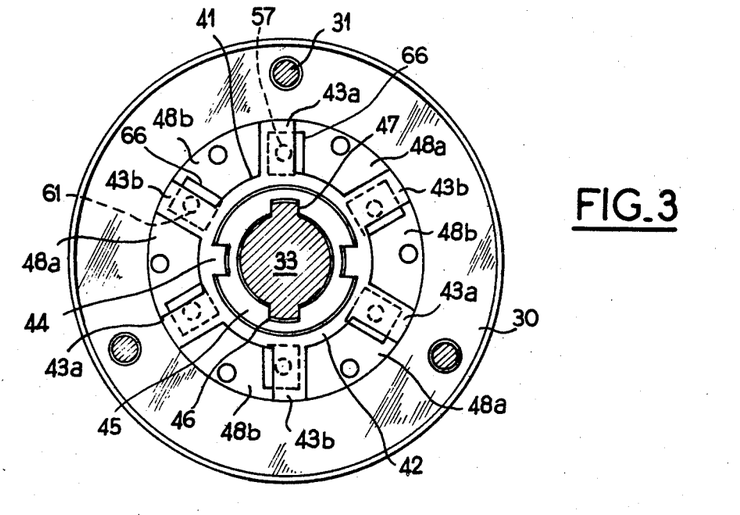
FIG. 3 shows a view similar to that shown by FIG. 2, illustrating the position of the components of the valve of the power steering device in a first position of operation.

When the driver actuates the steering wheel, the shaft 33 transmits the rotating movement to the control organ 41 which is thereby turned with respect to the distributor organ formed by parts 27, 29 and 30, as it is for example indicated in FIGS. 3 and 6. The chambers 48a are then openly connected with the openings 56a and allow the pressure oil to pass from the passage 57 to passages 50 through chambers 48a in such a manner that the actuation towards one of the sides takes place, as it can be seen in FIG. 6. The chambers 48b, on the contrary, are now perfectly isolated from the openings 56a and in direct communication with openings 56b thus permitting opening of fluid communication between passages 51 and 61 to prevoke free discharge of the oil contained in space 6 of the power steering device through the passages 51 to 54 and 61 towards the reservoir 65. The principles of operation of the steering device are the same for an actuation of the steering wheel in the opposite sense, as can be clearly deduced from FIGS. 4 and 7, with the result that, in that case, pressure is increased in space 6 and decreased in chamber 5.

From the explanations of the operating mode of the device of FIG. 1, it appears that the unit which is comprised of the spindle 13 and its head 20 (including flange 27), the annular plate 29 and the intermediate annular spacer 30 are submitted to two antagonistic axial forces created by the high pressure from pressure source 60: firstly, the pressure in the cavity which houses bearing 23 which acts on a first annular surface of plate 29, and secondly the pressure which has been transmitted to one of the compartments 5 or 6. According to the sense of rotation in operation, this second pressure may be that prevailing, in the cavity for bearing 24, and which acts on second annular surface of flange 27, or that prevailing in chamber 5, which acts on an effective cross-section of the spindle shown as on FIG. 1. In order to pressure balance the whole assembly during operation of the valve, it is preferred to render substantially equal the first annular surface, the second annular surface and the effective cross-section of the spindle. In this manner, bearings 23 and 24 are not submitted to large longitudinal stresses during operation.

Figure 4:
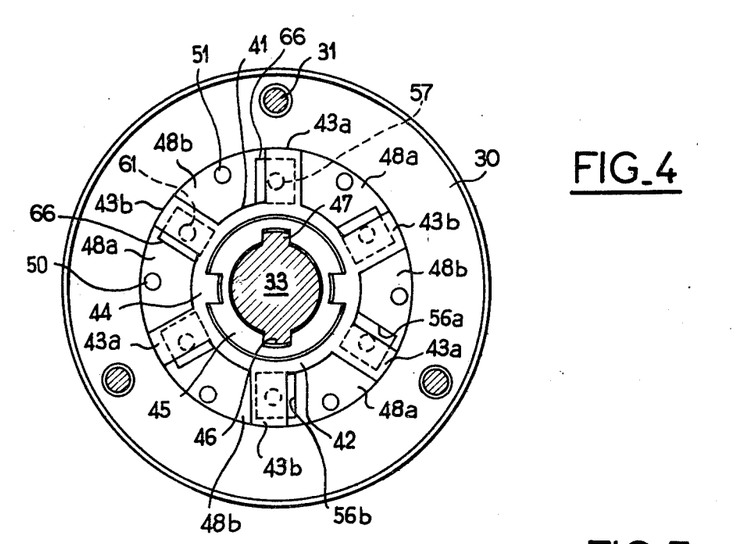
FIG. 4 shows a view similar to that shown by FIG. 2, illustrating the position of the components of the valve of the power steering device, in a second position of operation, FIGS. 5, 6 and 7 respectively show views in cross-section taken along line V—V of FIGS. 2, 3 and 4, FIGS. 8, 9 and 10 show views which are similar to FIGS. 2, 3 and 4 respectively, but which illustrate a modified embodiment of the power steering device according to the invention.
Figures 8, 9, 10:
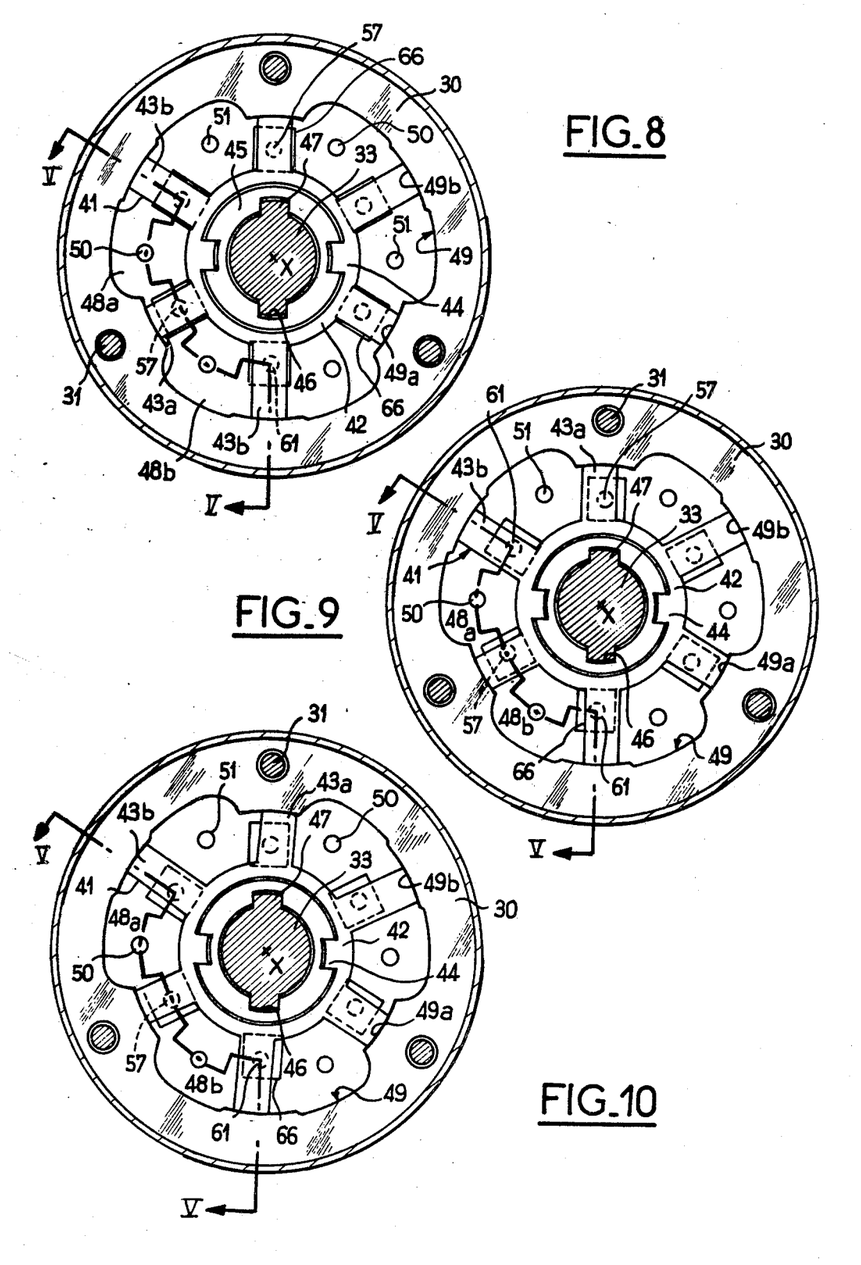

Considering now FIGS. 8 to 10 of the drawings, which illustrate a modified embodiment according to the invention, there are shown views in cross-section of a power steering device of the kind of that is shown on FIG. 1, which are substantially similar to the views in cross-section shown on FIGS. 2, 3 and 4 except for the shape of the star-shaped element and of the circumferential wall of the cavity in which it is located. The elements shown in FIGS. 8 to 10 which are similar to those shown on FIGS. 2 to 4, are designated by like numerical references.

The inner surface of the spacer ring 30 indicated with the general reference 49 comprises six projections in angular correspondance with the six radial legs 43 of the control organ 41, in such a manner that three of these projections 49a have their ends ground cylindrically to a given radius, and the other three projections 49b, alternately arranged between the former ones, are mechanized in the same way and with a bigger radius, with respect to the device's axis XX'. That is, the projections 49a and 49b of annular spacer 30 define wall portions of the disc-shaped chamber which are of an inner radius and of a larger outer radius, respectively. Every leg 43 of the control organ has its end ground in a manner that is complementary to the corresponding projection 49 of the disc-shaped cavity, and all these legs fit with the corresponding inner surfaces of the spacer ring, in such a manner that between these surfaces three chambers 48a are delimited which are alternately arranged between another three chambers 48b, all them being mutually independant and fluidically isolated with respect to the adjacent spaces of the device. Due to the different inner radii of the projections 49a and 49b and of the respective legs 43a and 43b of the control organ fitting with them, every chamber 48a is circumferentially delimited by a leg 43b in a clockwise direction and by a leg 43a of the control organ in an anticlockwise direction, and every chamber 48b is circumferentially delimited by a leg 43a in a clockwise direction, and by a leg 43b of the said organ in an anticlockwise direction, and since the radial surface area of the circumferentially oriented faces of legs 43b is bigger than that of the same faces of legs 43a, a fluid pressure acting in every one of the said chambers will apply antagonistic forces to the legs delimiting it, and the ones corresponding to legs 43b will be bigger than the ones applied to legs 43a and hence a torque will be applied on the control organ to the purposes further down described.

The operation of the power steering device which is shown in FIGS. 8 to 10 in combination with FIG. 1, is substantially the same as that which has previously been explained with reference to FIGS. 1 to 7. However, in addition, it should be noted that when the star shaped element 41 occupies the position shown on FIGS. 6 and 9, chamber 48a finds itself at the same high pressure that is acting on the face of piston 3 corresponding to the actuation chamber 5 of the servoactuator and the lateral faces of the legs 43b and 43a of the control organ 41 respectively delimiting the said chamber 48a receive the corresponding different thrusts due to the different surface areas of these faces in such a manner that the thrust received by the leg 43b is stronger than that applied to the leg 43a and consequently a greater effort acts on leg 43b, since the chamber 48b at the other side of the said leg 43b finds itself at a practically null pressure, which is that corresponding to the discharge pressure of chamber 6 of the servoactuator. The same situation repeats itself for everyone of the other two pairs of chambers 48a and 48b flanked by the other two legs 43b with the bigger surface, and hence the control organ 41 is submitted to a torque having a sense contrary to that of actuation and which is proportional to the actuation pressure used, and hence to the steering gear's reaction.

The same situation in the opposite sense arises when the steering gear is actuated towards the opposite side, according to FIGS. 7 and 10.

Figure 11:
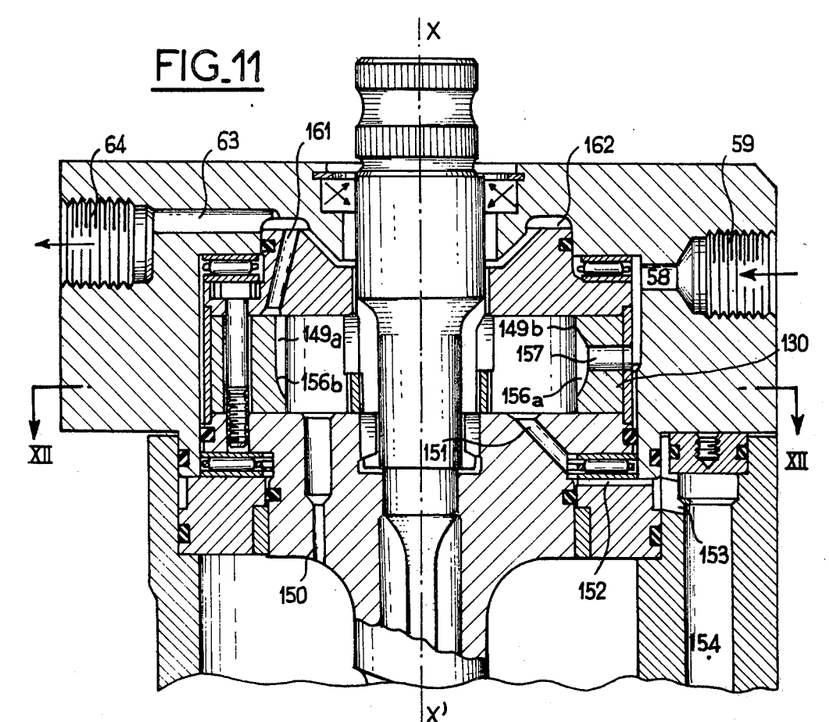
FIG. 11 shows a partial longitudinal view in cross-section of another embodiment of the power steering device according to the invention.
Figure 12:
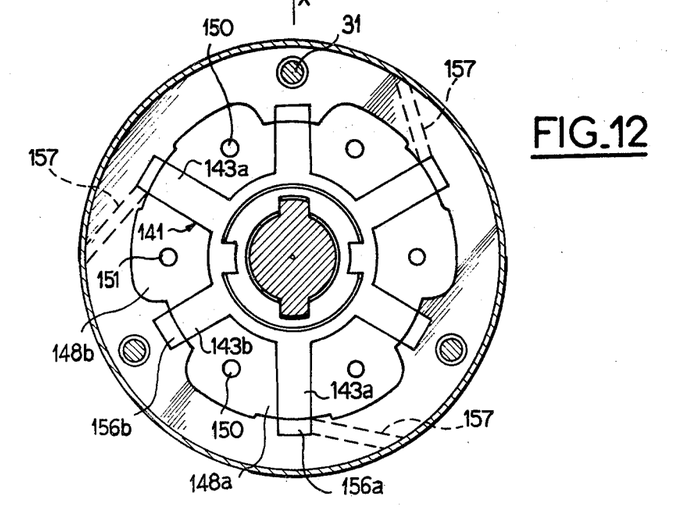
FIG. 12 shows a view in cross-section taken along line XII—XII of FIG. 11.

The embodiment illustrated in FIGS. 11 and 12 is different to the previous ones in the sense that the openings 56a and 56b, which are now indicated with the ref. nos. 156a and 156b, have been foreseen in the cylindrical surface segments 149a and 149b of the circumferential wall of the distributor organ 130, whose axial dimension is in this case a little longer than in the previous described embodiments. The end surfaces of the legs 143 of the control organ 141 are the ones working in this case in conjunction with the described openings or slots to give the valve effect, and it is not necessary to foresee the pressure balancing cavities 66, since this counterbalancing effect takes place automatically around the six control organ's legs.

These slots or openings are related with the described fluid circuits in the same manner as in the previous embodiments, and the passages leading to the actuating chambers of the power steering device have been here indicated by the same reference increased by 100. The operation of this valve device variant is exactly the same as has been previously described, and it can be appreciated that there is also in this case a reaction that indicates the working point of the steering's geometry at every moment. In this type of power steering device, the increase in the axial dimension is nevertheless not too important and does not affect substantially the overall size of the unit. It should be understood that the structure of FIGS. 11 and 12 could also be used with a power steering device incorporating a star-shaped control organ having legs 43 of equal radial length. In both embodiments of the power steering device, the increase in the axial dimention is nevertheless not too important and does not substantially affect the overall size of the power steering device.

Figure 13:
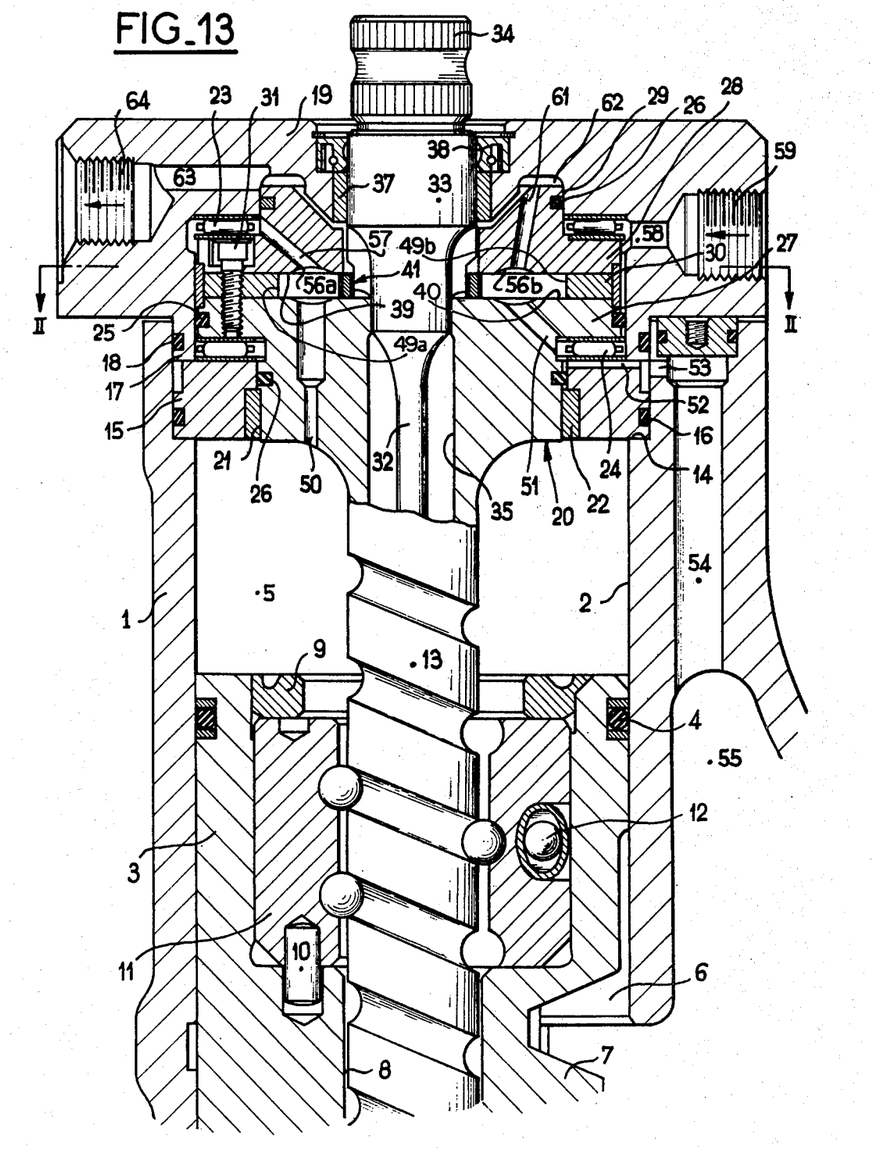
FIG. 13 shows a partial longitudinal view in cross-section of a modified embodiment of a power steering device according to the present invention, FIGS. 14, 15 and 16 respectively show views in cross-section taken along line II of the power steering device shown FIG. 13, in different positions of operation.
Figures 14, 15, 16:
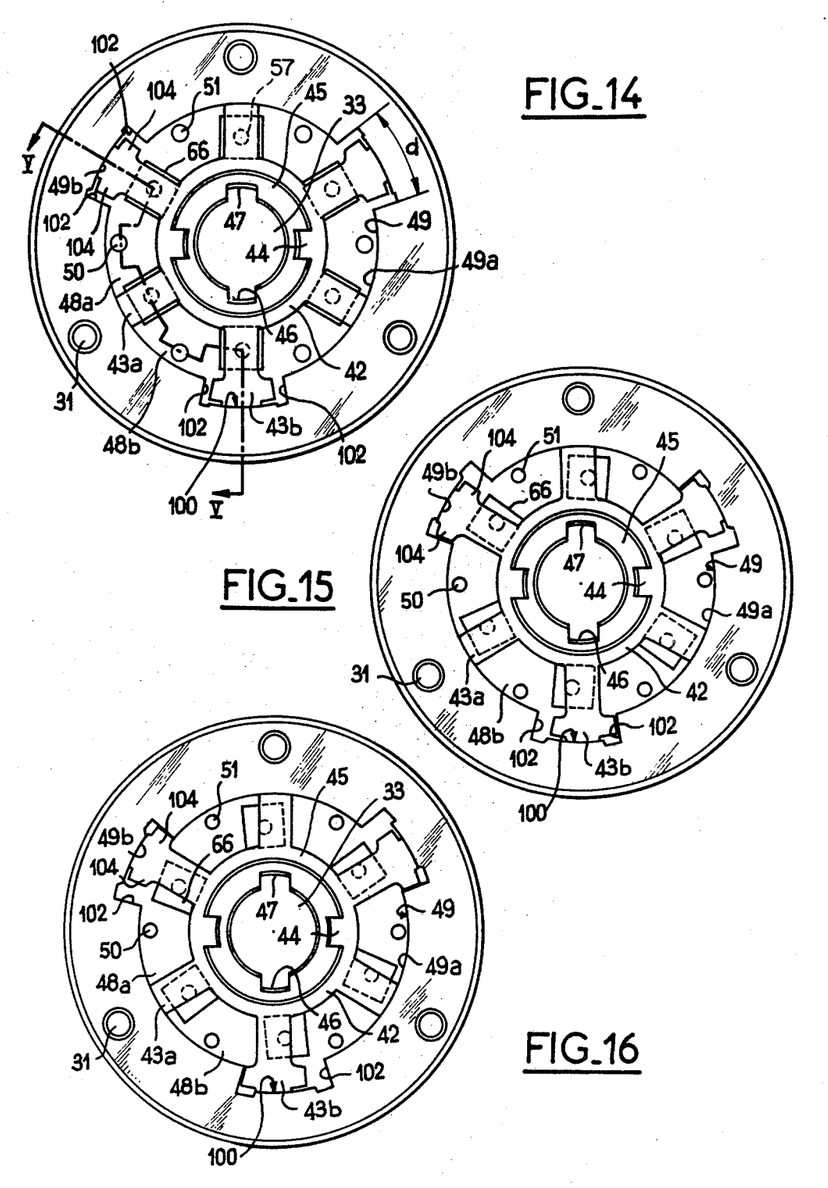

FIGS. 13 to 17 illustrate a power steering device which is substantially similar to that of FIGS. 1 and 8 to 10 except for the following features: the combination 36 of loose fitting ribs and grooves which is mounted with clearance, as shown in FIG. 1 has been suppressed in the power steering device of FIG. 13. To the mechanical transmission which was so defined between the input and output members 33 and 13 is substituted another mechanical transmission of a different concept clearly illustrated in FIGS. 14 to 16. In the inner surface 49 of the spacer ring are defined six cylindrical surface portion in angular correspondance with the six radial legs 43 of the control organ. The cylindrical surface portions comprises three cylindrical surface portions 49a which are alternately arranged with three other cylindrical surface portions 49b. In the embodiment shown on FIGS. 14 to 16, wherein the control organ comprises three legs 43a of smaller radius alternatively disposed with three legs 43b of greater radius, the portions 49a are associated with the legs 43a of smaller radius so that they are cylindrically ground with a given radius complementary to that of the legs 43a. In the same manner the portions 49b have been mechanized with a bigger radius with respect to the axis of the device. The three portions 49b are defined by the bottom surfaces of grooves 100 formed in the inner surface of spacer ring 30, and in which the respective extremities of the arms 43b project. Each groove 100 comprises two radial edges 102, the purpose of which will be illustrated later. As is the case in the previously described embodiments, every leg 43 of the control organ has its end ground in a manner that is complementary to the corresponding cylindrical surface segment 49a, 49b so as to fit with the same. Each groove 100 has a circumferential dimension "d" which is slightly larger than the width, taken in the same direction, of the end portions of the legs 43b projecting in such grooves. Each leg 43b comprises two circumferential projections 104 respectively facing the radial edges 102 of groove 100 with a rather small intermediate space between the edges 102 and the corresponding projections. The purpose of these projections is to come into contact with the edges 102 which act as stop means or abutment means for the control organ. The torsion bar 32 normally keeps the control organ in the rest position illustrated in FIG. 14, i.e. the legs 43b remain at equal distance of the radial edges 102, and the space between both elements corresponds to the angular travel of the star-shaped control element with respect to the distributor annular ring, which is necessary to take up the play between these elements (see FIGS. 15 and 16). The operation of the control valve is substantially the same as that previously described with respect to FIGS. 2 to 10. The sole difference consists in the fact that, in case of failure of the power assistance, projections supported by each arm 43b of the star-shaped organ will come into abutment with one of the radial edges 102 of the corresponding grooves 100, so that the mechanical effort applied to the control organ is directly transmitted to the annular ring, and also the spindle when the projections 104 come into contact with one of the edges 102. When this occurs the contact surfaces are of rather large value so that a correct operation can be expected, even in the case of a direct actuation without any hydraulic assistance. It will be appreciated when considering FIG. 13, that the axial dimension of the power steering device can be substantially reduced in comparison with that shown on FIG. 1, since the grooves and ribs arrangement designated by reference 36 has been suppressed.

It should also be understood that the modification shown on FIGS. 13 to 16 has been described with reference to a power steering device having a control organ with legs 43 of different lengths which are alternately disposed around the annular hub 42. However, the provision of stop means or abutment means formed on the distributor organ and, cooperating with a star-shaped control organ having legs of identical radial length (of the type of that of FIGS. 2 to 4) could also be contemplated and would fall within the scope of the present invention.

Figure 17:
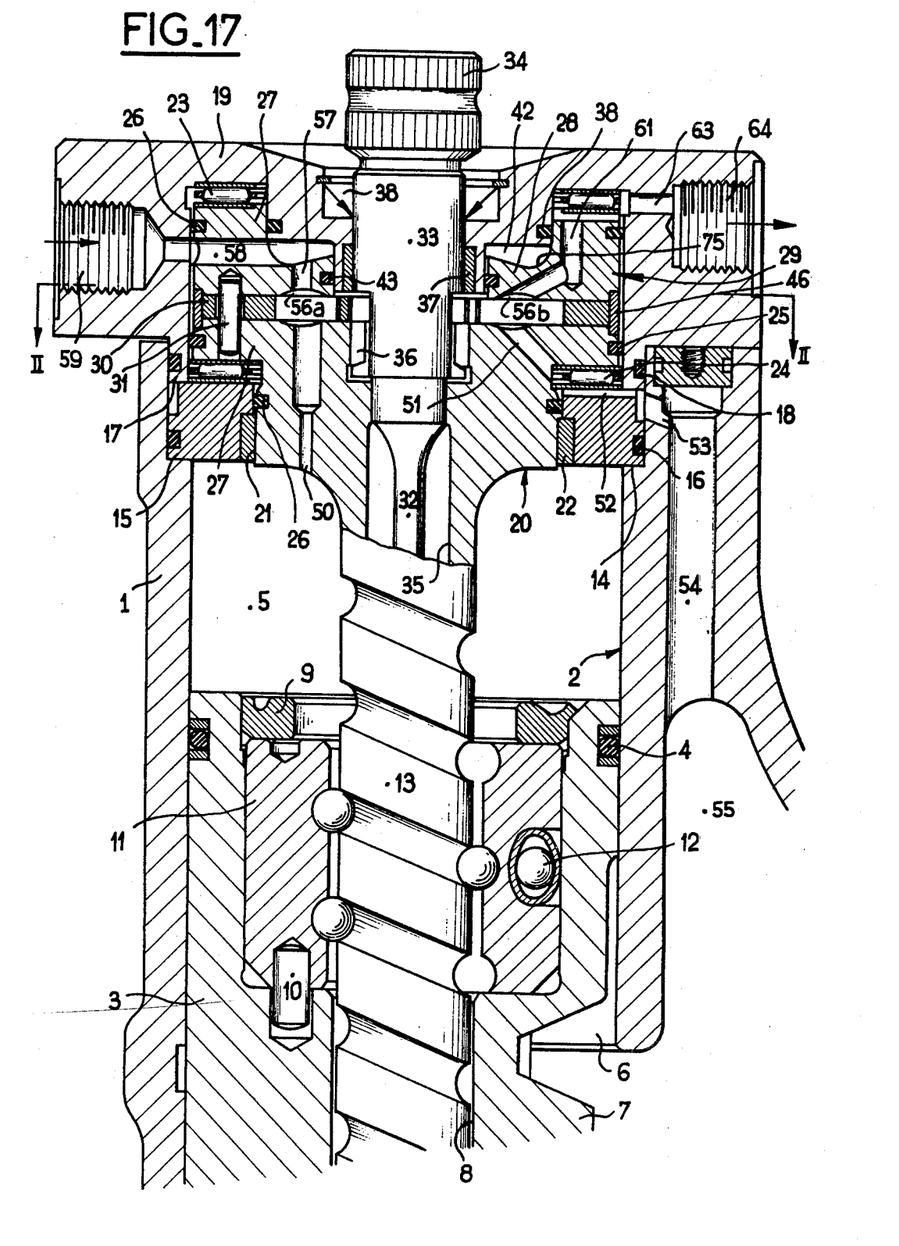
FIG. 17 shows a partial longitudinal view in cross-section of another modified embodiment of the power steering device according to the invention.

Considering now FIGS. 17 to 21, relating to the structure and operation of a modified embodiment of the invention, there has been shown a power steering device which is substantially the same as that shown on FIG. 1, except that the structure of the distribution organ has been slightly modified. In the following description, elements of FIG. 17 which are identical or similar to those of FIG. 1 bear the same numerical references. In FIG. 17, the flange-like portions of the head consists in a flange 27 which incorporates the needle race for needle bearing 24 and an annular plate 29 comprising a crown-like portion 27a which axially extends in upwards direction and incorporates the needle race for needle bearing 23. The annular plate 29 also comprises an inner plate portion 28, and the annular spacer 30 is fastened between flange 27 and annular plate 29, by means of press-fitted pins 30 in the same manner as for the embodiment of FIG. 1. The space provided for needle bearing 23, between the crown-shaped portion 27 and the cover 19 is in communication with a low-pressure source by means of a channel 63 and an outlet port 64. This space is sealed by means of two O-ring seals 26 and 38 respectively mounted between the cover 19 and annular faces of the crown-shaped portion. In the same manner, the space for needle bearing 24 which is provided in the housing, is closed between two seals 25, 26.

According to a particular feature of the embodiment of FIGS. 17 to 21, the axially oriented surfaces of the star-shaped control organ 41 fit with a given axial clearance, with the axially opposite walls 39 and 40 of the disc shaped chamber which is defined between flange 27 and annular plate 29. In more concrete terms, the lower surface of the control organ fits with surface 40 of part 20, and the upper surface of said control organ is slightly separated from the surface 39 for the purposes further described later. The inner plate portion 28 of plate 29 is designed in such a manner that its outer annular zone connecting said plate portion 28 to the crown-shaped portion 27 comprises a weakened portion 75 which is so designed that the plate portion 28 can elastically bend under the action of the actuating fluid pressure in a cavity 42 on the face of portion 28 opposite the disc-shaped chamber, which is isolated by seals 43 and 26. When the plate portion 28 bends, the initial clearance between the surface 39 and the opposite face of the control organ is partially or totally eliminated, thus tending to reduce the cross-section of the passage between the legs and the opening. Therefore, such feature enables to control the cross-section of the passages for fluid in the distributor, as a function of pressure in cavity 42, that is the pressure which is communicated from the high pressure source, through opening 59 and passages 58. Of course, this pressure controlled cross-section feature can be used either as an alternative to the solution which has been previously exposed, in which chamferings or radiusings 68 have been provided in the lateral edges of legs 43, or additionally to that solution. In the same manner, such feature can as well be designed in a power steering device having a star-shaped organ, the legs 43 of which have all the same radius.

Figures 18, 19, 20, 21:
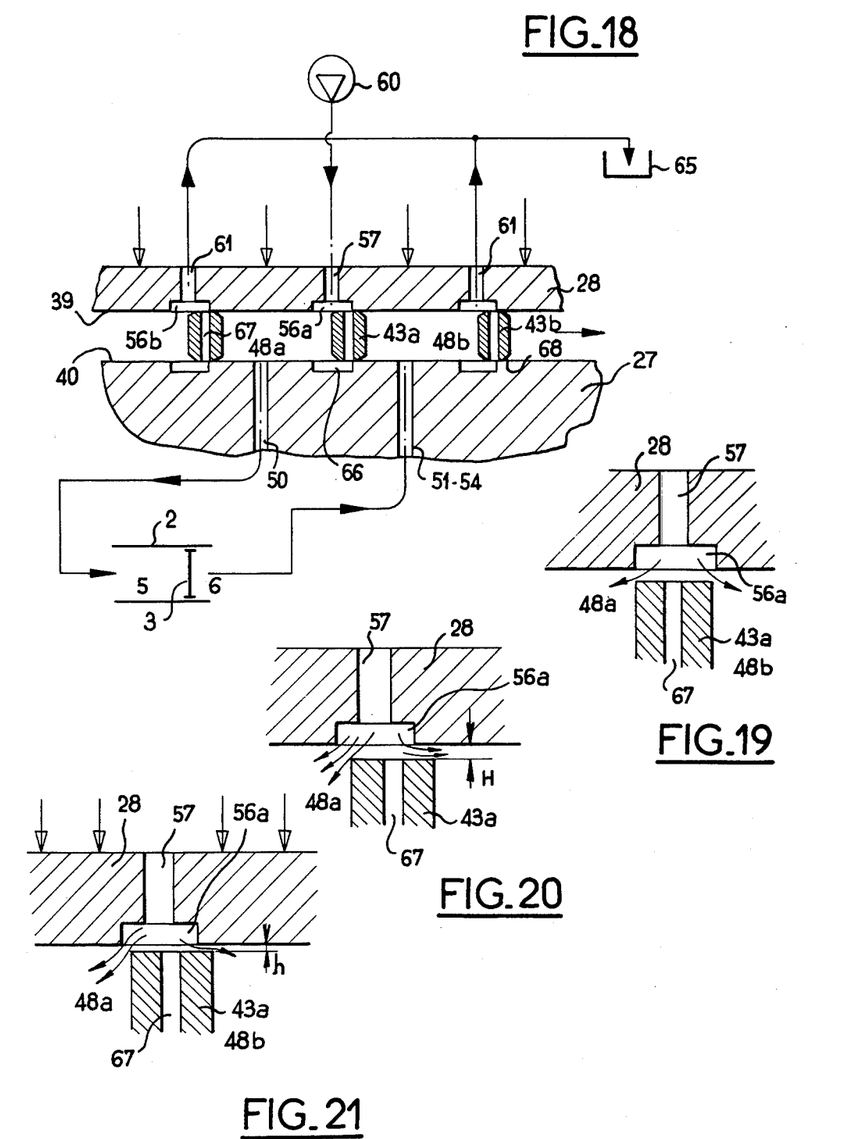
FIG. 18 shows a view similar to FIG. 6 illustrating the position of the star-shaped rotor in the disc-shaped chamber, during operation.
FIGS. 19 to 21 show enlarged views illustrating the principle of operation of the embodiment of the invention shown at FIGS. 17 and 18.

In operation, the power steering device works substantially in the same manner as the previously described embodiments. In the rest position as shown in FIG. 19, the part 28 receives practically the same pressure on both its faces and thus remains in a rest position. When the system is actuated, that is when the star-shaped organ has rotated with respect to the distributor organ (see FIG. 18), the work pressure establishes itself in chambers 48a and cavity 42, while chambers 56b remain at the low pressure of the discharge orifice, and therefore a force created by the differential pressure acts on the upper face of organ 28, and the latter is thus bent downwards by its weakened zone 75 and reaches the position shown in FIG. 21. FIG. 20 shows the position that the parts would have adopted if the compensation would not exist, and FIG. 21 shows the final state after the turning of the control organ and the deformation of organ 28. It can be appreciated from the comparison of FIGS. 20 and 21, that the dimension h (FIG. 21) is substantially reduced with respect to the one marked H (FIG. 20). It can also be seen from the comparison that, while the cross-section area of the passage communicating passage 57 to chamber 48b is substantially reduced upon deformation of part 28, on the contrary, the cross-section area of the passage between passage 57 and chamber 48a remains relatively large so that uninhibited fluid communication is not substantially affected. In FIGS. 19 to 21, it should be noted that the chamfering to the openings and the legs of the control organ have not been represented for better convenience.

Of course, a similar situation arises when the input member of the power steering device is rotated in the other direction.

Although, the embodiments of the system according to the invention have been described in relation with a power steering device comprising a control valve of the open-center type, it is clear that the inventive concept could also be applied to a power steering device of the closed center type. For this purpose, it would be necessary that, in their rest position, the legs 43 of the control organ integrally cover the openings 56a, 56b of the distributor.

What we claim is:

1. A control valve, particularly for power steering with an actuating member (33) and an actuated member (20) rotatable relative to each other and having a rest position into which they are positioned in the absence of actuating forces, the control valve comprising a disc-shaped valve chamber (39, 40, 30) formed by said members (20, 33) and having an inner circumferential wall and end walls (39, 40) with fluid channels opening therein through respective openings, namely supply channels (57) for fluid supply, drain channels (61) for fluid drain, first working channels (50) for connection with a first working chamber (5) of a fluid motor and second working channels (51) for connection with a second working chamber (6) of the fluid motor, a rotor (41) arranged within and rotatable relative to said disc-shaped valve chamber, said rotor serving for selectively connecting said first or second working channels with said drain channels, said rotor being coupled to one of said actuating member (33) and actuated member (20), and further comprising, for equilibration of hydraulic load onto both sides of the rotor, a mirror image arrangement of the openings (56a, 56b) of said supply and drain channels and recesses (66) in the confronting end walls (39, 40) of said disc-shaped valve chamber, characterized by said rotor (41) being star-like with a plurality of legs (43a, 43b) having substantially radially extending lateral faces and radial end faces, the end faces sealingly cooperating with said inner circumferential wall of said disc-shaped valve chamber, said lateral faces of said legs facing the openings of said mirror image arrangement, and lateral edges of said legs controlling the fluid flow and defining within said disc-shaped valve chamber operative fluid chambers (48a, 48b), said working channels communicating with said operative fluid chambers.

2. A control valve according to claim 1, characterized by said star-like rotor (41) including through holes (67) in said rotor for communication of pairs of openings and recesses of said miror image arrangement.

3. A control valve according to claim 2, wherein pairs of openings and recesses of the mirror image arrangement have substantially radially extending straight edges cooperating with said lateral edges of confronting legs of said star-like rotor to control fluid communication between said pairs of openings and recesses of said mirror image arrangement and adjacent fluid chambers (48) as a function of the angular position of the rotor in said valve chamber and thereby providing a large possible variation of fluid passage cross-sections between said pairs of openings and recesses (56, 66) and said fluid chambers (48) as a function of the rotation of the star-like rotor away from its rest position.

4. A control valve according to claim 3, wherein at least said lateral edges of said confronting legs are chamfered (68) to adjust the flow characteristics of said fluid passage cross-sections.

5. A control valve according to claim 1, characterized in that said legs are regularly angularly positioned around a central hub (42) of said star-like rotor.

6. A control valve according to claim 1, characterized in that said disc-shaped valve chamber is defined by two pieces (27, 28) having substantially flat surfaces (39, 40) and an annular spacer (30) disposed between said flat surfaces to define an inner cavity, said substantially flat surfaces forming said end walls of said disc-shaped valve chamber.

7. A control valve according to claim 6, characterized in that said two pieces and said annular spacer are secured together by securing means (31) such as screw means.

8. A control valve according to claim 1, characterized in that abutment means (102) for legs of the star-like rotor are formed in said disc-shaped valve chamber for limiting the rotation of the star-like rotor in said chamber to a predetermined maximum value, so that the star-like rotor and the valve chamber are adapted to rotate as a whole after the legs of the star-like rotor have come into contact with said abutment means.

9. A control valve according to claim 1, characterized in that the peripheral surface of said disc-shaped valve chamber is provided with at least two sets of cylindrical portions (49a, 49b) of different respective curvature radii and the star-shaped rotor comprises at least two sets of corresponding legs (43a, 43b) of different lengths, two adjacent legs belonging to said two sets, respectively, defining one aforesaid operative fluid chamber, the legs (43a) of the set of shortest legs substantially facing said supply channel openings (57).

10. A control valve according to claim 9, characterized by two sets of cylindrical portions and two sets of corresponding legs of different lengths wherein the longest legs (43b) substantially face the aforesaid drain channel openings (56b).

11. A control valve according to claim 9, characterized in that the circumferential wall of the disc-shaped valve chamber comprises radially outwardly extending grooves (100) into which the ends of the longest legs project.

12. A control valve according to claim 9, characterized in that the circumferential wall of the disc-shaped valve chamber comprises angularly spaced arcuate radial grooves (100) into which the ends of the longest legs project, and in that bottoms of the radial grooves define one aforesaid set of cylindrical portions (49b) and side walls (102) of said radial grooves provide abutment means for the corresponding longest legs.

13. A control valve according to claim 1, characterized in that said actuating member and said actuated member are connected to each other by resilient means comprising preferably a torsion bar (32).

14. A control valve according to claim 1, comprising positive linking means (46, 47) between said star-like rotor and said actuating member, the linking means allowing a relative axial displacement between said star-like rotor and said actuating member.

15. A control valve according to claim 14, characterized in that said star-like rotor is a generally flat member having a hole in its central hub, that said hole has a noncircular cross-section and that said actuating member comprises a part having a shape substantially complementary to the cross-section of said hole, said part entering said hole.

16. A control valve according to claim 14, characterized in that the disc-shaped valve chamber is attached to the actuated member, the latter comprising a steering spindle (13) associated with a nut (11) acting as a servo-piston of said fluid motor comprising said first and second working chambers (5, 6), said disc-shaped valve chamber being formed in a broadened head (20) of the steering spindle (13).

17. A control valve according to claim 16, characterized in that said head (20) has a surface (40) which defines one of the end walls of the valve chamber.

18. A control valve according to claim 17, characterized in that said head (20) comprises said first and second working channels (50, 51) defined therewithin.

19. A control valve for a power steering device comprising a housing, an actuating member (33) rotatably extending axially into the housing, an actuated member (20) rotatably disposed within the housing and coupled to the actuating member to permit limited rotation therebetween, a piston movably disposed within the housing to separate a pair of working chambers, the piston cooperating with the actuated member such that rotation of the latter imparts movement to the piston, the actuated member defining a supply passage for receiving fluid pressure, a drain passage for discharging fluid pressure and a pair of working passages communicating, respectively, with a pair of working chambers, and the actuated member defining a disc-shaped chamber communicating with all of the passages and receiving a rotor which is rotatably actuated by the actuating member to selectively control communication of fluid pressure toward the pair of working chambers, characterized in that said actuated member includes a first flange (27) forming one end wall (40) for said disc-shaped chamber and a second flange (28) forming a second end wall (39) for said disc-shaped chamber, said end walls being formed with openings through which all of the passages respectively open in said disc-shaped chamber, and said rotor comprises a star-like rotor with a plurality of legs (43a, 43b) disposed within said disc-shaped chamber, said plurality of legs including radially outer ends engageable with a radially outer circumferential wall of said disc-shaped chamber and cooperating with said end walls to define movable chambers (48a, 48b) within said disc-shaped chamber, said plurality of legs normally aligning with said supply and drain passages in a rest position, and said star-like rotor being rotatable within said disc-shaped chamber away from the rest position to increase communication between the supply passage and one of the working chambers via one of the working passages and one of the movable chambers while at the same time increasing communication between the drain passage and the other working chamber via the other working passage and the other movable chamber.

20. The control valve of claim 19, in which said end walls (39, 40) extend radially within said housing and all of said passages extend from one or the other of said end walls (39, 40).

21. The control valve of claim 19, in which said actuated member (20) includes a spacer (30) engaging said walls (39, 40) and forming the outer circumferential wall of said disc-shaped chamber, and said plurality of legs (43a 43b) are engageable with said spacer (30).

22. The control valve of claim 21, in which said spacer is formed with an aperture for receiving securing means (31) fastening said first flange (27) with said second flange (28).

23. The control valve of claim 19, in which said one end wall is further provided with recesses (66) normally aligning with said plurality of legs (43a, 43b) in the rest position.

24. The control valve of claim 23, in which said plurality of legs (43a, 43b) are provided with apertures (67) to communicate said supply and drain passages (57, 61) with selected recesses (66).

* * * * *